(12) United States Patent
Schattenmann et al.

(10) Patent No.: US 6,730,766 B2
(45) Date of Patent: May 4, 2004

(54) ORGANOPOLYSILOXANES HAVING QUATERNARY AMMONIUM GROUPS AND PROCESSES FOR THE PREPARATION THEREOF

(75) Inventors: Wolfgang Schattenmann, Burghausen (DE); Michael Messner, Semmelsberg (DE); Renate Minigshofer, Taubenbach/Reut (DE); Evelyn Richter, Freising/Pulling (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/202,822

(22) Filed: Jul. 25, 2002

(65) Prior Publication Data

US 2003/0045666 A1 Mar. 6, 2003

(30) Foreign Application Priority Data

Aug. 14, 2001 (DE) .......................................... 101 39 963

(51) Int. Cl.$^7$ .............................................. C08G 77/26
(52) U.S. Cl. ........................... 528/28; 528/38; 556/408; 556/425
(58) Field of Search ..................................... 528/28, 38

(56) References Cited

U.S. PATENT DOCUMENTS

| | | | |
|---|---|---|---|
| 3,046,250 A | | 7/1962 | Plueddemann |
| 4,533,714 A | | 8/1985 | Sebag et al. |
| 4,833,225 A | * | 5/1989 | Schaefer et al. ............... 528/28 |
| 4,891,166 A | | 1/1990 | Schaefer et al. |

FOREIGN PATENT DOCUMENTS

| | | |
|---|---|---|
| DE | 646 339 | 6/1937 |
| DE | 1 493 384 | 1/1969 |
| DE | 29 12 485 | 10/1980 |
| DE | 33 40 708 | 5/1984 |
| DE | 100 36 678 A1 | 2/2002 |
| EP | 0 017 121 | 10/1980 |
| EP | 0 282 720 | 9/1988 |
| EP | 0 294 525 | 12/1988 |
| EP | 0 349 926 A2 | 1/1990 |
| EP | 0 606 159 | 7/1994 |
| GB | 1076259 | 7/1967 |
| GB | 1 200 611 | 7/1970 |

OTHER PUBLICATIONS

English Derwent Abstract AN 2002–382418 [41] Corresponding To DE 100 36 678 A.
English Derwent Abstract AN 1971–171305[10] Corresponding To DE 1493384B.
English Derwent Abstract AN 1988–251058[36] Corresponding To EP 282720.
English Derwent Abstract AN 1984–121956[20] Corresponding To DE 3340708A.
English Derwent Abstract AN 1980–737296[42] Corresponding To EP 0017121A.
English Derwent Abstract AN 1980–73729C[72] Corresponding To DE 2912485A.
J. Macromol. Sci., Pure Appl. Chem. (1995), vol. A32 (8&9), pp. 1641–1648, CODEN, JSPCE6, 1060–1325 ISSN.
Caplus Abstract AN 1937:28047 Corresponding To DE 646 339.

* cited by examiner

Primary Examiner—Margaret G. Moore
(74) Attorney, Agent, or Firm—Brooks Kushman P.C.

(57) ABSTRACT

Organopolysiloxanes bearing quaternary ammonium groups and containing units of the general formula

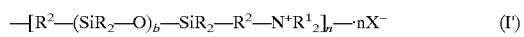

$$-[R^2-(SiR_2-O)_b-SiR_2-R^2-N^+R^1{}_2]_n-nX^- \qquad (I')$$

where
- R are identical or different monovalent, SiC-bonded, optionally substituted $C_{1-12}$ hydrocarbon radicals,
- $R^1$ are identical or different monovalent, optionally substituted $C_{1-12}$ hydrocarbon radicals or are a bridging alkylene radical,
- X is an organic or inorganic anion,
- $R^2$ is a divalent hydrocarbon radical having at least 4 carbon atoms which contains at least one hydroxyl group and is optionally interrupted by one or more oxygens,
- b is an integer from 1 to 200 and
- n is an integer from 1 to 50.

and processes for the preparation thereof.

12 Claims, No Drawings

ORGANOPOLYSILOXANES HAVING QUATERNARY AMMONIUM GROUPS AND PROCESSES FOR THE PREPARATION THEREOF

BACKGROUND OF THE INVENTION

1. Field of the Invention

The invention relates to organopolysiloxane polymers bearing quaternary ammonium groups ("quaternized polysiloxanes") and to processes for the preparation of these compounds.

2. Background Art

Quaternized polysiloxanes have been known for a long time from the literature. In this connection, various methods are described for their preparation. DE-A-1493384 can be given by way of example for the preparation of lateral quaternary siloxanes. Lateral epoxy group-containing siloxanes are reacted with secondary amines such as dimethylamine and alkylated in a further step with corresponding alkylating agents, such as methyl chloride. α,ω-quaternary polysiloxanes have likewise been described widely, such as, for example, in EP-A-17121, in which α,ω-quaternary polysiloxanes are prepared by reacting corresponding epoxy-functionalized polysiloxanes with tertiary amines in the presence of an acid. In addition, EP-A-606159 discloses the preparation of α,ω-quaternary polysiloxanes by two different procedures, first by the reaction of α,ω-chloroalkyl group-containing polysiloxanes with tertiary amines, and second by the reaction of allyl-containing tertiary amines with Si-H-containing siloxanes and subsequent quaternization of the tertiary nitrogen.

In the field of polyquaternary polysiloxanes which contain the quaternized nitrogen in the siloxane backbone, reference should be made, for example, to U.S. Pat. No. 4,533,714 and the corresponding DE-A 33 40 708, which describe polyquaternary polysiloxanes having two quaternary ammonium groups per repeating unit, where the nitrogen atoms are bonded to silicon atoms exclusively via —$(CH_2)_{1-6}$ bridges. In addition, EP-A-282720 discloses polysiloxane polymers having, in each case, two quaternary ammonium groups per unit, bonded via a hydroxyl group-containing hydrocarbon bridge which may also contain oxygen atoms or nitrogen atoms. For the purposes of the present invention, the term "organopolysiloxanes" is intended to include polymers, oligomers and also dimeric siloxanes.

SUMMARY OF THE INVENTION

The present invention pertains to processes for the manufacture of quaternized polysiloxanes by reaction of epoxy-functional polysiloxane III

Y—$(SiR_2$—$O)_b$—$SiR_2$—Y  (III)

as defined hereafter, with an amine salt or an amine, followed by quaternization. Process varients can be used to control the relative numbers of epoxy and quaternized amino groups as well as the viscosity of the resulting product.

DETAILED DESCRIPTION OF THE PREFERRED EMBODIMENT(S)

The invention provides organopolysiloxanes having quaternary ammonium groups and containing units of the general formula

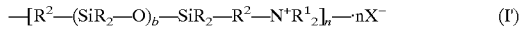

—$[R^2$—$(SiR_2$—$O)_b$—$SiR_2$—$R^2$—$N^+R^1_2]_n$—$nX^-$  (I')

where
  R is identical or different and is a monovalent, SiC-bonded, optionally substituted hydrocarbon radical having 1 to 12 carbon atoms,
  $R^1$ is identical or different and is a monovalent, optionally substituted hydrocarbon radical having 1 to 12 carbon atoms, or is a constituent of a bridging alkylene radical,
  $X^-$ is an organic or inorganic anion,
  $R^2$ is a divalent hydrocarbon radical having at least 4 carbon atoms which contains at least one hydroxyl group and is optionally interrupted by one or more oxygens,
  b is an integer from 1 to 200 and
  n is an integer from 1 to 50.

The organopolysiloxanes having quaternary ammonium groups according to the invention may be cyclic, linear or branched compounds which, apart from the units of the formula (I'), may have in the chain any other units, such as, for example, $R_3SiO_{1/2}$, $RSiO_{3/2}$ or $SiO_{4/2}$ units, where R has the meaning given above, in the chain.

The organopolysiloxanes having quaternary ammonium groups according to the invention are preferably those of the general formula

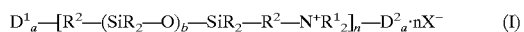

$D^1_a$—$[R^2$—$(SiR_2$—$O)_b$—$SiR_2$—$R^2$—$N^+R^1_2]_n$—$D^2_a$·$nX^-$  (I)

where
  R is identical or different and is a monovalent, SiC-bonded, optionally substituted hydrocarbon radical having 1 to 12 carbon atoms,
  $R^1$ is identical or different and is a monovalent, optionally substituted hydrocarbon radical having 1 to 12 carbon atoms or is a constituent of a bridging alkylene radical,
  $X^-$ is an organic or inorganic anion,
  $R^2$ is a divalent hydrocarbon radical having at least 4 carbon atoms which contains at least one hydroxyl group and is optionally interrupted by one or more oxygens,
  a is 0 or 1,
  b is an integer from 1 to 200,
  n is an integer from 1 to 50,
  $D^1$ is a hydrogen atom, hydroxyl radical, halide radical, $NH_2$ radical or a monovalent organic radical and
  $D^2$ is a group of the formula

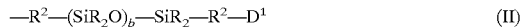

—$R^2$—$(SiR_2O)_b$—$SiR_2$—$R^2$—$D^1$  (II)

where R, $R^2$, D1 and b have the meanings given above.

Organopolysiloxanes having quaternary ammonium groups according to the invention of the general formula (I) may be cyclic compounds, i.e. where a is in each case 0, and also linear compounds where a is in each case 1. In preferred compounds, a has the value 1.

Examples of radicals R and $R^1$ are alkyl radicals such as the methyl, ethyl, n-propyl, isopropyl, n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radical; cycloalkyl radicals such as cyclopentyl, cyclohexyl, cycloheptyl radicals and methylcyclohexyl radicals; aryl radicals such as the phenyl and the naphthyl radicals; alkaryl radicals such as o-, m-, p-tolyl radicals, xylyl radicals and ethylphenyl radicals; aralkyl radicals such as the benzyl radical, and the α- and β-phenylethyl radicals;

If the radicals R and $R^1$ are substituted hydrocarbon radicals, preferred substituents are hydroxyl groups. The radical R is preferably a hydrocarbon radical having 1 to 6 carbon atoms, most preferably the methyl radical. The radical $R^1$ is preferably a hydrocarbon radical having 1 to 8 carbon atoms, most preferably an alkyl radical having 1 to 6 carbon atoms or a benzyl radical. The radical $R^1$ can, however, also be a divalent radical derived therefrom, so that, for example, two radicals $R^1$ may form a ring with the nitrogen atom.

Examples of anion $X^-$ are organic anions, such as carboxylate ions, enolate ions and sulfonate ions, and inorganic anions such as sulfate ions and halide ions, for example, chloride ions, bromide ions and iodide ions. The anion $X^-$ is preferably a carboxylate ion or a halide ion, more preferably a chloride ion or acetate ion.

Examples of radical $R^2$ are divalent linear, cyclic or branched, saturated or unsaturated hydrocarbon radicals having at least 4 carbon atoms, which contain at least one hydroxyl group and are optionally interrupted once or more than once by oxygen atoms, such as all alkylene radicals having at least 4 carbon atoms and at least one hydroxyl group, arylene radicals having at least one hydroxyl group,

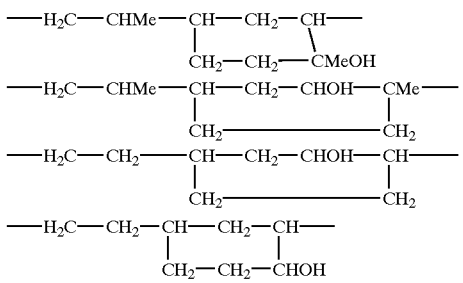

—$(CH_2)_3OCH_2$—CH(OH)—$CH_2$— and —$(CH_2)_3OCH_2$—$CH_2$—CH(OH)—, where Me is the methyl radical.

The radical $R^2$ is preferably an alkylene radical having at least 4 carbon atoms and at least one hydroxyl group, most preferably —$(CH_2)_3OCH_2$—CH(OH)—$CH_2$— and —$(CH_2)_3OCH_2$—$CH_2$—CH(OH)—. In Formula I, b is preferably an integer from 1 to 100, and n is preferably an integer from 1 to 20, more preferably from 2 to 20.

Examples of radicals $D^1$, where $D^1$ is an organic radical, are alkyl radicals, alkoxy radicals, nitrogen-containing organic radicals such as amines, sulfur-containing organic radicals such as sulfonate radicals, or organic or inorganic anions attached to carbon, for example carboxylates and halogenated hydrocarbon radicals. The radical $D^1$ is preferably a hydrogen atom, hydroxyl radical, alkyl radical, alkoxy radical, amine radical, halide radical, carboxylate radical or enolate radical, more preferably a hydrogen atom, hydroxyl radical, amine radical, halide radical, acetate radical or propionate radical.

Examples of the organopolysiloxanes according to the invention are cyclo-[A-$CH_2O(CH_2)_3$—$(Si(CH_3)_2O)_8$—$Si(CH_3)_2$—$(CH_2)_3OCH_2$-A-$N^+(CH_3)_2]_m$·mCl⁻, where A is —CH(OH)$CH_2$— or —$CH_2$CH(OH)— and m is 2–4;
$A^1$-[A-$CH_2O(CH_2)_3$—$(Si(CH_3)_2O)_8$—$Si(CH_3)_2$—$(CH_2)_3$ $OCH_2$-A-$N^+(CH_3)_2]_2$—$Si(CH_3)_2O)_8$—$Si(CH_3)_2$—$(CH_2)_3$ $OCH_2$-A-$A^1$·2Cl⁻,
$A^1$-[A-$CH_2O(CH_2)_3$—$(Si(CH_3)_2O)_8$—$Si(CH_3)_2$—$(CH_2)_3$ $OCH_2$-A-$N^+(CH_3)_2]_{15}$—$Si(CH_3)_2O)_8$—$Si(CH_3)_2$—$(CH_2)_3OCH_2$-A-$A^1$·15Cl⁻ and
$A^1$-[A-$CH_2O(CH_2)_3$—$(Si(CH_3)_2O)_8$—$Si(CH_3)_2$—$(CH_2)_3$ $OCH_2$-A-$N^+(CH_3)_2]_m$—$Si(CH_3)_2O)_8$—$Si(CH_3)_2$—$(CH_2)_3$ $OCH_2$-A-$A^1$·m Cl⁻,
where A is —CH(OH)$CH_2$— or —$CH_2$CH(OH)—, $A^1$=—OH, —Cl or —N$(CH_3)_2$ and m is 3–14;
cyclo-[A-$CH_2O(CH_2)_3$—$(Si(CH_3)_2O)_{50}$—$Si(CH_3)_2$—$(CH_2)_3OCH_2$-A-$N^+(CH_3)_2]_m$·m Cl⁻,
where A is —CH(OH)$CH_2$— or —$CH_2$CH(OH)— and m is 2–4;
$A^1$-[A-$CH_2O(CH_2)_3$—$(Si(CH_3)_2O)_{50}$—$Si(CH_3)_2$—$(CH_2)_3$ $OCH_2$-A-$N^+(CH_3)_2]_2$—$Si(CH_3)_2O)_8$—$Si(CH_3)_2$—$(CH_2)_3$ $OCH_2$-A-$A^1$·2 Cl⁻,
$A^1$-[A-$CH_2O(CH_2)_3$—$(Si(CH_3)_2O)_{50}$—$Si(CH_3)_2$—$(CH_2)_3$ $OCH_2$-A-$N^+(CH_3)_2]_{15}$—$Si(CH_3)_2O)_8$—$Si(CH_3)_2$—$(CH_2)_3OCH_2$-A-$A^1$·15 Cl⁻ and
$A^1$-[A-$CH_2O(CH_2)_3$—$(Si(CH_3)_2O)_{50}$—$Si(CH_3)_2$—$(CH_2)_3$ $OCH_2$-A-$N^+(CH_3)_2]_m$—$Si(CH_3)_2O)_8$—$Si(CH_3)_2$—$(CH_2)_3$ $OCH_2$-A-$A^1$·m Cl⁻,
where A is —CH(OH)$CH_2$— or —$CH_2$CH(OH)—, $A^1$=—OH, —Cl or —N$(CH_3)_2$ and m is 3–14;
cyclo-[A-$CH_2O(CH_2)_3$—$(Si(CH_3)_2O)_{50}$—$Si(CH_3)_2$—$(CH_2)_3OCH_2$-A-$CH_3N^+(CH_2)_3CH_3]_m$·m $H_3CC_6H_5SO_3^-$,
where A is —CH(OH)$CH_2$— or —$CH_2$CH(OH)— and m is 2–4;
$A^1$-[A-$CH_2O(CH_2)_3$—$(Si(CH_3)_2O)_{50}$—$Si(CH_3)_2$—$(CH_2)_3$ $OCH_2$-A-$CH_3N^+(CH_2)_3CH_3]_2$—$Si(CH_3)_2O)_8$ —$Si(CH_3)_2$—$(CH_2)_3OCH_2$-A-$A^1$·2 $H_3CC_6H_5SO_3^-$,
$A^1$—[A-$CH_2O(CH_2)_3$—$(Si(CH_3)_2O)_{50}$—$Si(CH_3)_2$—$(CH_2)_3$ $OCH_2$-A-$CH_3N^+(CH_2)_3CH_3]_{15}$—$Si(CH_3)_2O)_8$—$Si(CH_3)_2$—$(CH_2)_3OCH_2$-A-$A^1$·15 $H_3CC_6H_5SO_3^-$ and
$A^1$-[A-$CH_2O(CH_2)_3$—$(Si(CH_3)_2O)_{50}$—$Si(CH_3)_2$—$(CH_2)_3$ $OCH_2$-A-$CH_3N^+(CH_2)_3CH_3]_m$—$Si(CH_3)_2O)_8$—$Si(CH_3)_2$—$(CH_2)_3OCH_2$-A-$A^1$·m $H_3CC_6H_5SO_3^-$
where A is —CH(OH)$CH_2$— or —$CH_2$CH(OH)—, $A^1$=—OH, —$N^+CH_3H(CH_2)_3CH_3$, —NH$(CH_2)_3CH_3$ or —$SO_3C_6H_5CH_3$ and m is 3–14

The organopolysiloxanes according to the invention have a viscosity at 25° C. of preferably 50,000 to 5,000,000 mPas.

The organopolysiloxanes according to the invention have the advantage that they have only one quaternary ammonium group per repeat unit, as a result of which the nitrogen content of the compounds can be adjusted in an extremely flexible manner.

The organopolysiloxanes can be prepared by various methods. They are preferably prepared by reaction of α,ω-epoxy-terminated organopolysiloxanes with nitrogen compounds chosen from primary amines, secondary amines, and salts of secondary amines, a process which is further provided by the present invention.

The present invention further provides a process (process variant 1) for the preparation of organopolysiloxanes having quaternary ammonium groups which comprises reacting epoxy group-containing organopolysiloxane of the formula $$Y—(SiR_2—O)_b—SiR_2—Y \qquad (III)$$

where R and b have the meaning given above and Y is an epoxy-containing radical, directly with the salt of a secondary amine of the formula $$H_2NR^1_2{}^+X^- \qquad (IV)$$

where $R^1$ and $X^-$ have the abovementioned meaning. The compound (IV) is preferably a dialkylammonium halide or dialkylammonium carboxylate, particular preference being given to dimethylammonium chloride.

In the process variant 1, preference is given to using compounds of the formula (III) and of the formula (IV) in an amount such that the molar ratio of epoxy groups Y to amine is preferably in the range from 1.6:1 to 2.2:1, more preferably 2:1.

Process variant 1 is preferably carried out in the presence of solvents. Examples of such solvents are polar solvents such as water, alcohols, ethers and glycols, and also nonpolar solvents such as toluene, and mixtures of different solvents, preference being given to polar solvents and mixtures thereof, and particular preference being given to water, alcohols, and glycols and mixtures thereof.

If solvent is used in the process variant 1, the amounts are preferably from 5 to 50% by weight, more preferably 20 to 40% by weight, in each case based on the total weight of the reaction mixture.

Process variant 1 is generally carried out at temperatures of from 60 to 150° C., more preferably from 60 to 130° C., depending on the solvent used, and preferably at a pressure of the ambient atmosphere, i.e. about 900 to 1100 hPa.

The compounds of the formulae (III) and (IV) are commercially available products or can be prepared by methods customary in chemistry. The epoxy group-containing organopolysiloxane of the formula (III) is preferably prepared by reacting α,ω-hydridopolysiloxanes of the general formula

H—(SiR$_2$—O)$_b$—SiR$_2$—H        (III'), where R and b have the meanings given above, with equimolar amounts, based on SiH groups, of an epoxide which has a terminal aliphatic carbon-carbon multiple bond, where the epoxide has at least 4 carbon atoms and can additionally contain a noncyclic ether group, in the presence of a hydrosilylation catalyst in a manner known per se. The addition of Si-bonded hydrogen onto an aliphatic carbon-carbon multiple bond, known as hydrosilylation, is preferably carried out at temperatures of from 50 to 150° C. and a pressure of the ambient atmosphere, i.e., 900 to 1100 hPa. Hydrosilylation catalysts which may be used include the catalysts of subgroup 8 of the Periodic Table, preferably platinum catalysts, in particular hexachloroplatinic acid and tetramethyldivinyldisiloxane-containing Pt(0) complexes.

Examples of terminally aliphatically unsaturated epoxides used include:

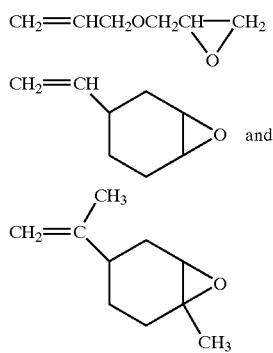

The organopolysiloxanes having quaternary ammonium groups can, if desired, be isolated by generally known processes when the reaction is complete for example by removing the solvent.

Process variant 1 according to the invention has the advantage that organopolysiloxanes having quaternary ammonium groups can be prepared in a simple manner and with a high yield, and has the further advantage that it is possible to control the viscosity via nitrogen to epoxy stoichiometry.

The present invention further provides a process (process variant 2) for the preparation of organopolysiloxanes having quaternary ammonium groups which comprises, in a first step, reacting epoxy group-containing organopolysiloxane of the formula (III) with a primary amine of the formula H$_2$NR$^1$ (V) and, in a second step, reacting the aminosiloxane obtained in the first step with a compound R$^1$X, where R$^1$ and X have the meanings given above and R$^1$ may be identical or different. In the second step of process variant 2, a radical R$^1$ is introduced onto the nitrogen atom of the aminosiloxane obtained in the first step. The introduction of this radical R$^1$ by R$^1$X shall be referred to below as "alkylation." The compound (V) used according to the invention is preferably a substituted or unsubstituted alkylamine, particular preference being given to unsubstituted alkylamines.

The compound R$^1$X used as alkylating agent is preferably C$_6$H$_5$CH$_2$—X and CH$_3$—X, where X may be a chloride, bromide or iodide ion, CH$_3$OSO$_3^-$ or CH$_3$C$_6$H$_4$SO$_3^-$.

Preferably, in the first step of process variant 2, compounds of the formula (III) and of the formula (V) are used in an amount such that the molar ratio of epoxy groups Y to amine of the formula (V) is preferably in the range from 1.6:1 to 2.2:1, more preferably 2:1.

The reaction in the second step of process variant 2 preferably takes place stoichiometrically with regard to alkylating agent R$^1$X and amine of the formula (V). However, stoichiometries are also conceivable in which the alkylating agent is used less than stoichiometric amount with respect to amine if, for example, only partial quaternization is to take place.

Process variant 2 is preferably carried out in the presence of solvents. Examples of such solvents are polar solvents, such as water, alcohols, ether and glycols, and also nonpolar solvents, such as toluene. Mixtures of different solvents may also be used, preference being given to polar solvents and mixtures thereof, with particular preference being given to water, alcohols, and glycols, and mixtures thereof. If solvent(s) are used, the amounts are preferably from 5 to 50% by weight, more preferably 20 to 40% by weight, in each case based on the total weight of the reaction mixture.

Process variant 2 is generally carried out at temperatures of from 60 to 150° C., more preferably from 60 to 130° C., depending on the solvent used, and preferably at a pressure of the ambient atmosphere, i.e. about 900 to 1100 hPa. The compounds of the formulae (V) and the alkylating agent R$^1$X are commercially available products or can be prepared by methods customary in chemistry. The organopolysiloxanes having quaternary ammonium groups can be isolated by generally known processes when the reaction is complete, for example by removal of the solvent.

Process variant 2 has the advantage that organopolysiloxanes having quaternary ammonium groups can be prepared in a simple manner and with a high yield, and has the further advantage that it permits partial quaternization without altering the chain lengths of the system.

The present invention further provides a process (process variant 3) for the preparation of organopolysiloxanes having quaternary ammonium groups which comprises, in a first stage, reacting the epoxy group-containing organopolysiloxane of the formula (III) with a secondary amine of the formula HNR$^1_2$ (VI) in a molar ratio of amino groups to epoxy groups of less than 1, preferably 1:1.8 to 1:2.2, more preferably 1:2, and, in a second stage, reacting the epoxy groups which have not taken part in the reaction, with tertiary amine groups obtained in the first stage with addition of an acid HX in a molar ratio of amine groups to HX of from 0.8:1 to 1.4:1, preferably 1:1, where X has one of the abovementioned meanings.

The present invention further provides a process (process variant 4) for the preparation of organopolysiloxanes having quaternary ammonium groups which comprises, in a first stage, reacting the epoxy group-containing organopolysiloxane of the formula (III) with a secondary amine of the formula $HNR^1_2$ (VI) in a molar ratio of amino groups to epoxy groups of greater than or equal to 1, preferably 50:1 to 1:1 and, in a second stage, reacting the resulting reaction product with further epoxysiloxane of the formula (III) with the addition of an acid HX in a molar ratio of amine function to HX of from 0.8:1 to 1.4:1, preferably 1:1, where X has one of the abovementioned meanings.

Process variant 4 according to the invention is primarily used when the amine of the formula (VI) is a gas under the reaction conditions, for example dimethylamine. The compound (VI) used is preferably a substituted or unsubstituted alkylamine, particular preference being given to dimethylamine.

Process variants 3 and 4 are preferably conducted in the presence of solvents. Examples of such solvents are polar solvents such as water, alcohols, ethers and glycols, and also nonpolar solvents such as toluene. Mixtures of different solvents may also be used, preference being given to polar solvents and mixtures thereof, and also toluene, with particular preference being given to water, alcohols, glycols, and toluene. If solvent(s) are used in process variants 3 and 4, the amounts are preferably from 5 to 50% by weight, particularly preferably 20 to 40% by weight, in each case based on the total weight of epoxysiloxane of the formula (III).

Process variants 3 and 4 are generally carried at temperatures of 60 to 150° C., more preferably from 60 to 130° C., depending on the solvent used, and preferably at a pressure of the ambient atmosphere, i.e., for example, 900 to 1100 hPa. The compounds of the formulae (VI) and the acid HX are commercially available products or can be prepared by methods customary in chemistry. The organopolysiloxanes having quaternary ammonium groups prepared can, if desired, be isolated by generally known processes when the reaction is complete, both in the case of process variant 3 and also in the case of process variant 4, for example, by removal of the solvent.

The process variant 3 according to the invention has the advantage that organopolysiloxanes having quaternary ammonium groups can be prepared in a simple manner and with a high yield. The process variant 4 also has the advantage that organopolysiloxanes having quaternary ammonium groups can be prepared in a simple manner and with a high yield.

The organopolysiloxanes having quaternary ammonium groups are preferably prepared by the process variant 1 or 2.

The organopolysiloxanes having quaternary ammonium groups can be used for all purposes for which known siloxanes having quaternary ammonium groups have also hitherto been used, for example in bacteriocidal or cosmetic preparations or as constituents of textile finishings.

In the examples below, unless stated otherwise, all data for parts and percentages are based on the weight, and are carried out at a pressure of the ambient atmosphere, i.e. at about 1000 hPa, and at room temperature, i.e. about 20° C. or a temperature which is established when the reactants are combined at room temperature without additional heating or cooling. All of the viscosity data given in the example are based on a temperature of 25° C.

Preparation of an α,ω-epoxy-containing Organopolysiloxane (Epoxysiloxane I) of the General Formula

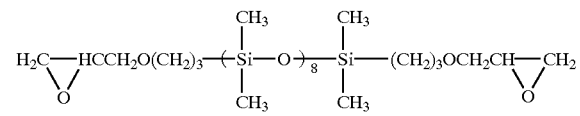

320 g of allyl glycidyl ether are heated to 80° C., and treated with 5.3 mg of elemental platinum in the form of a 0.5% strength solution of hexachloroplatinic acid in dimethoxyethane. Then, over the course of 30 minutes, 740 g of an α,ω-SiH-containing polydimethylsiloxane with an H % content equal to 0.301 are metered in. After a reaction period of a further 30 minutes, the product is freed from excess allyl glycidyl ether in vacuo at 130° C., yielding 953 g of an α,ω-epoxy-containing organopolysiloxane with an epoxy content of 0.243 mol per 100 g.

Preparation of an α,ω-epoxy-containing Organopolysiloxane (Epoxysiloxane II) of the General Formula

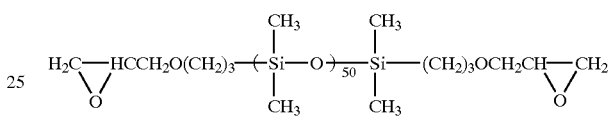

320 g of allyl glycidyl ether are heated to 80° C., and treated with 20.0 mg of elemental platinum in the form of a 0.5% strength solution of hexachloroplatinic acid in dimethoxyethane. Then, over the course of 30 minutes, 3,670 g of an SiH-containing polydimethylsiloxane with an H % content equal to 0.053 are metered in. After a reaction period of a further 30 minutes, the product is freed from excess allyl glycidyl ether in vacuo at 130° C., yielding 3,870 g of an α,ω-epoxy-containing organopolysiloxane with an epoxy content of 0.049 mol per 100 g.

EXAMPLE 1

Process Variant 1

6.3 g of dimethylammonium chloride are dissolved in a mixture of 33 g of isopropanol and 13 g of water. Then, with thorough stirring, 60.5 g of the above-described epoxysiloxane I are added. The mixture is heated to reflux and stirred at this temperature for 5.5 hours. The solvent mixture is then removed at 110° C. under a high vacuum, yielding 63 g of a yellowish product with a viscosity of 204,000 mPas which comprises units of the general formula

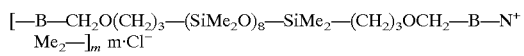

where B is —$H_2C$—CH(OH)— or —HC(OH)—$CH_2$—, Me is the methyl radical and m is, on average, 5. The organopolysiloxane prepared in this way can be cyclic or linear. For the linear types, —Cl and —$N(CH_3)_2$ are also detectable as end groups in addition to —OH.

EXAMPLE 2

Process Variant 1

6.3 g of dimethylammonium chloride are dissolved in a mixture of 100 g of isopropanol and 40 g of water. Then, with thorough stirring, 300 g of the above-described epoxysiloxane II are added. The mixture is heated to reflux and stirred at this temperature for 5.5 hours. The solvent mixture is then removed at 110° C. under a high vacuum, yielding 302 g of a yellowish product with a viscosity of 1,900,000 mPas containing units of the general formula

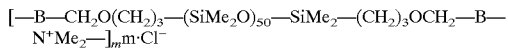

where B is —H$_2$C—CH(OH)— or —HC(OH)—CH$_2$—, Me is the methyl radical and m is 9. The organopolysiloxane obtained in this way can be cyclic or linear. For the linear types, —Cl and —N(CH$_3$)$_2$ are also detectable as end groups in addition to —OH.

EXAMPLE 3

Process Variant 2

6.3 g of n-butylamine are heated to reflux with 100 g of isopropanol and 300 g of the above-described epoxysiloxane II is added and stirred at this temperature (about 86° C.) for 3 hours. The solvent is then removed at 110° C. under high vacuum.

100 g of this crude product, having a viscosity of 2,800 mm$^2$/s, are added to 50 g of isopropanol and treated with 5.1 g of methyl 4-toluenesulfonate and heated to 50° C. After a reaction time of 5.5 hours at 60° C., the solvent is removed under reduced pressure at 110° C., yielding 102 g of a yellowish product with a viscosity of 340,000 mPas, containing units of the general formula

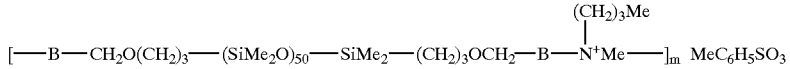

where B is —H$_2$C—CH(OH)— or —HC(OH)—CH$_2$—, Me is the methyl radical and m is 11. The organopolysiloxane obtained in this way may be cyclic or linear. For the linear types, —CH$_3$NH$^+$(CH$_2$)$_3$CH$_3$, —NH(CH$_2$)$_3$CH$_3$ and —SO$_3$C$_6$H$_5$CH$_3$ are also detectable as end groups in addition to —OH.

EXAMPLE 4

Process Variant 4

150 g of the above-described epoxysiloxane II are heated to 75° C. with 100 g of isopropanol. A condenser cooled with dry ice/acetone is placed onto the reaction flask. Dimethylamine is slowly introduced into the reaction solution for 4 hours such that reflux commences and the reaction temperature does not drop below 70° C. Excess dimethylamine and the solvent are then removed at 110° C. under high vacuum. 100 g of isopropanol, 150 g of the above-described epoxysiloxane II and 7.24 g of a 37% strength HCl and 40 g of water are again added to this crude product. The mixture is heated to reflux, and after a reaction period of 5.5 hours at reflux, the solvent is removed under reduced pressure at 110° C., yielding 303 g of a yellowish product with a viscosity of 240,000 mPas containing units of the general formula

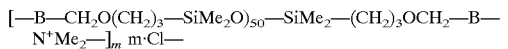

where B is —H$_2$C—CH(OH)— or —HC(OH)—CH$_2$—, Me is the methyl radical and m is 7. The organopolysiloxane obtained in this way can be cyclic or linear. For the linear types, —Cl and —N(CH$_3$)$_2$ are also detectable as end groups in addition to —OH.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" have their customary meaning of "one or more" unless indicated otherwise.

What is claimed is:

1. An organopolysiloxane having quaternary ammonium groups and containing a plurality of units of the general formula

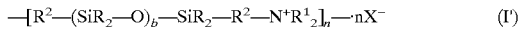

where
R are identical or different monovalent, SiC-bonded, optionally substituted C$_{1-12}$ hydrocarbon radicals,
R$^1$ are identical or different monovalent, optionally substituted C$_{1-12}$ hydrocarbon radicals or are a bridging alkylene radical,
X$^-$ is an organic or inorganic anion,
R$^2$ is a divalent hydrocarbon radical having at least 4 carbon atoms which contains at least one hydroxyl group and is optionally interrupted by one or more non-adjacent oxygens,
b is an integer from 1 to 200,
n is an integer from 1 to 5, and
wherein said n units of the formulae —[R$^2$—(SiR$_2$—O)$_b$—SiR$_2$—R$^2$—N$^+$R$^1$$_2$]— are not bonded at the quaternary ammonium nitrogen atom via an alkylene radical directly to a further quaternary ammonium nitrogen atom.

2. The organopolysiloxane having quaternary animonium groups of claim 1, which has the general formula

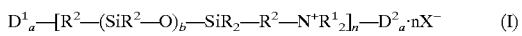

where
R are identical or different monovalent, SiC-bonded, optionally substituted C$_{1-12}$ hydrocarbon radicals,
are identical or different monovalent, optionally substituted C$_{1-12}$ hydrocarbon radicals or are a bridging alkylene radical,
X$^-$ is an organic or inorganic anion,
R$^2$ is a divalent hydrocarbon radical having at least 4 carbon atoms which contains at least one hydroxyl group and is optionally interrupted by one or more non-adjacent oxygens,
a are both 0 or are both 1,
b is an integer from 1 to 200,
n is an integer from 1 to 50,
D$^1$ is a hydrogen atom, hydroxyl radical, halide radical, NH$_2$ radical or a monovalent organic radical,
D$^2$ is a group of the formula

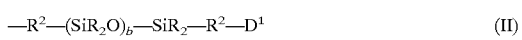

where R, R$^2$, D$^1$ and b have the meanings given above, and wherein when both a are 0, the organopolysiloxane of formula (I) is a cyclic organopolysiloxane wherein the leftmost end of the moiety —[R²—(SiR₂—O)_b—SiR₂—N⁺R¹₂]_n— is bonded to its rightmost end.

3. The organopolysiloxane having quaternary ammonium groups of claim 1, wherein R is a methyl radical.

4. The organopolysiloxane of claim 1 wherein all quaternary nitrogen atoms are terminal quaternary nitrogen atoms or are linked to a silicon atom by an intervening R² alkylene unit.

5. The organopolysiloxane of claim 1 wherein said n units are not bonded at the quaternary nitrogen atom via alkylene radical R¹ directly to a further quaternary ammonium nitrogen atom.

6. An organopolysiloxane having quaternary ammonium groups, having the formula

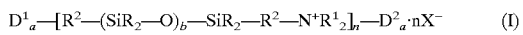  (I)

where
R are identical or different monovalent, SiC-bonded, optionally substituted C₁₋₁₂ hydrocarbon radicals,
R¹ are identical or different monovalent, optionally substituted C₁₋₁₂ hydrocarbon radicals or are a bridging alkylene radical,
X⁻ is an organic or inorganic anion,
R² is a divalent hydrocarbon radical having at least 4 carbon atoms which contains at least one hydroxyl group and is optionally interrupted by one or more non-adjacent oxygens,
a is 1,
b is an integer from 1 to 200,
n is an integer from 1 to 50,
D¹ is a hydrogen atom, hydroxyl radical, halide radical, NH₂ radical or a monovalent organic radical, and
D² is a group of the formula —R²—(SiR₂O)_b—SiR₂—R²—D¹  (II)

where R, R², D¹ and b have the meanings given above.

7. An organopolysiloxane having quaternary ammonium groups and containing a plurality of units of the general formula

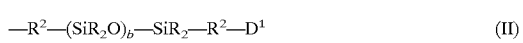  (I')

where
R are identical or different monovalent, SiC-bonded, optionally substituted C₁₋₁₂ hydrocarbon radicals,
R¹ are identical or different monovalent, optionally substituted C₁₋₁₂ hydrocarbon radicals or are a bridging alkylene radical,
X⁻ is an organic or inorganic anion,
R² is a divalent hydrocarbon radical having at least 4 carbon atoms which contains at least one hydroxyl group and is optionally interrupted by one or more non-adjacent oxygens,
b is an integer from 1 to 200 and
n is an integer from 1 to 50
wherein the quaternary nitrogen atom of the moiety

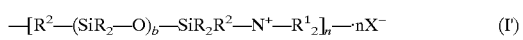

is bonded to the leftmost R² moiety of the same or a further moiety of the formula

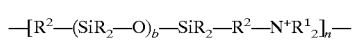

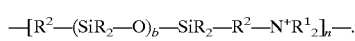

8. A process for the preparation of organopolysiloxanes having quaternary ammonium groups, and containing a plurality of units of the general formula

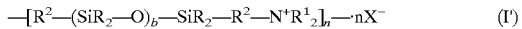  (I')

where
R are identical or different monovalent, SiC-bonded, optionally substituted C₁₋₁₂ hydrocarbon radicals,
R¹ are identical or different monovalent, optionally substituted C₁₋₁₂ hydrocarbon radicals or are a bridging alkylene radical,
X⁻ is an organic or inorganic anion,
R² is a divalent hydrocarbon radical having at least 4 carbon atoms which contains at least one hydroxyl group and is optionally interrupted by one or more non-adjacent oxygens,
b is an integer from 1 to 200, and
n is an integer from 1 to 50
said process comprising reacting an α,ω-epoxy-terminated organopolysiloxane with a primary mono-amine, secondary mono-amine, or salt of a secondary mono-amine.

9. The process of claim 8, wherein an epoxy group-containing organopolysiloxane of the formula

  (III)

where R and b have the meanings given above and Y is an epoxide-containing radical, is reacted directly with the salt of a secondary amine of the formula

H₂NR¹₂⁺X⁻  (IV)

where R¹ and X⁻ have the meanings given above.

10. The process of claim 8, wherein, in a first step, an epoxy group-containing organopolysiloxane of the formula

  (III)

is reacted with a primary amine of the formula H₂NR¹ (V) and, in a second step, the anilnosioxane obtained in the first step is reacted with a compound R¹X.

11. The process of claim 8, wherein, in a first stage, an epoxy group-containing organopolysiloxane of the formula

  (III)

is reacted with a secondary amine of the formula HNR¹₂ (VI) in a molar ratio of amino groups to epoxy groups of less than 1, and in a second stage, epoxy groups which have not taken part in the reaction are reacted with tertiary amine groups formed in the first stage, with the addition of an acid HX in a molar ratio of amine groups to HX of from 0.8:1 to 1.4:1.

12. The process of claim 8, wherein in a first stage, an epoxy group-containing organopolysiloxane of the formula

  (III)

is reacted with a secondary amine of the formula HNR¹₂ (VI) in a molar ratio of amino groups to epoxy groups of greater than or equal to 1, and in a second stage, the resulting reaction product is reacted with further epoxysiloxane of the formula (III) with the addition of an acid HX in a molar ratio of amine groups to HX of from 0.8:1 to 1.4:1.

* * * * *

UNITED STATES PATENT AND TRADEMARK OFFICE
CERTIFICATE OF CORRECTION

PATENT NO. : 6,730,766 B2
DATED : May 4, 2004
INVENTOR(S) : Wolfgang Schattenmann et al.

It is certified that error appears in the above-identified patent and that said Letters Patent is hereby corrected as shown below:

Column 10,
Line 44, in the formula, delete first occurrence of "$SiR^2$" and insert therefor -- $SiR_2$ --.

Column 12,
Line 41, delete "anilnosioxane" and insert therefor -- aminosiloxane --.

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,730,766 B2 Page 1 of 1
APPLICATION NO. : 10/202822
DATED : May 4, 2004
INVENTOR(S) : Wolfgang Schattenmann et al.

It is certified that error appears in the above-identified patent and that said Letters Patent is hereby corrected as shown below:

Column 10, line 36 of Patent:

Delete "n is an integer from 1 to 5, and"

and insert therefor:

-- n is an integer from 1 to 50, and --

Signed and Sealed this

Seventeenth Day of April, 2007

JON W. DUDAS
*Director of the United States Patent and Trademark Office*